United States Patent Office.

AUGUSTUS O. BOURN, OF PROVIDENCE, AND ISAAC F. WILLIAMS, OF BRISTOL, RHODE ISLAND.

Letters Patent No. 113,486, dated April 11, 1871

IMPROVEMENT IN THE MANUFACTURE OF RUBBER-BELTING.

The Schedule referred to in these Letters Patent and making part of the same.

*To all whom it may concern:*

Be it known that we, AUGUSTUS O. BOURN of the city and county of Providence, and ISAAC F. WILLIAMS, of Bristol, in the county of Bristol, both in the State of Rhode Island, have invented a new and useful Improvement in the Process of Making Machine-Belting or Banding of India Rubber or like vulcanizable gum; and we do hereby declare that the following specification is a full and exact description thereof.

The common method of making what is commonly known under the name of India-rubber belting is to take strips of heavy duck, and, after coating them with plastic India rubber, place two or more strips on top of each other until the requisite number of plies are obtained, and then vulcanize the rubber by the action of heat.

The surfaces of belts so made are rough, and should be made smooth before they are applied to driving machinery. Various improvements in the process for making such belts, having in view making the surfaces smooth, have been devised, but all with which we are acquainted contemplate that strips of metal or smooth-surfaced cloth or paper shall be interposed between the folds of the belt when wound in the form of a roll and while the rubber is yet plastic, whereby the surface of the belt shall be pressed smooth and in that state be vulcanized. Belts so made are an improvement over belts made by the old process first mentioned; but they are defective in this, that the surfaces, although smooth, are no more true than the surfaces of belts made by the old method.

Our improvement in the process of making belts of this class is as follows:

We first make the belt in the same way as first above described, and which has been commonly employed in all manufactories of rubber goods.

Our purpose is to make the surfaces of such belts as smooth and as true as the surface of belts of fine curried leather. We accordingly take a roll of belting after it has been vulcanized and conduct it over the surface of a drum mounted upon an axle or shaft so that it can revolve; or, instead thereof, we cause it to travel over the surface of a perfectly-flat iron-table. As the belt of rubber is passing over the said drum or flat table we cause its surface to be ground by the action of an emery-wheel of the same or greater width of face as the belt, hung in bearings in an overhanging frame, and made to revolve rapidly. The machine for this purpose may be constructed in a variety of ways, which will suggest themselves to any competent constructor. If a flat-surfaced table be used the grinding-wheel may be mounted in a hanger suspended from the ceiling, or from a cross-beam, connecting the tops of uprights bolted to the frame of the table. If the belt is made to pass over a drum the grinding-wheel may have its bearings in the same frame that supports the axle of the drum. In either case the distance between the surface of the grinding-wheel and the surface of the drum or table over which the belt passes gauges the thickness of the belt.

Obviously, the effect which will follow from treating a belt in the way described will be to make its surface perfectly true as well as smooth.

It is to be understood that we do not claim the machine for grinding the surfaces of rubber belts; but

What we claim as our invention, and desire to secure by Letters Patent, is—

The method herein described of imparting a smooth and true surface to belts or bands of India rubber or like vulcanized gums, the same consisting in subjecting the surface of a vulcanized belt to the action of a grinding-wheel in the manner substantially as herein described.

AUGUSTUS O. BOURN.
ISAAC F. WILLIAMS.

Witnesses:
PETER F. HUGHES,
A. J. CUSHING.